United States Patent Office 3,027,343
Patented Mar. 27, 1962

3,027,343
COATING COMPOSITION CONTAINING HYDROCARBON POLYMER AND POLYISOCYANATE-MODIFIED NITROGEN - CONTAINING POLYMER, FILM COATED THEREWITH, AND PROCESS FOR MAKING SAME
William Paul Kane, Richmond, Va., assignor to E. I. du Pont de Nemours and Company, Wilmington, Del., a corporation of Delaware
No Drawing. Filed May 21, 1957, Ser. No. 660,465
30 Claims. (Cl. 260—33.6)

This invention relates to the manufacture of polymeric, non-fibrous, flexible films such as cellulosic films and polyester films, particularly suited for conversion to bags, containers and similar packages. More particularly, it relates to the manufacture of such films coated with polymers of ethylenically unsaturated hydrocarbons.

For several reasons, films composed of the polymers derived from the ethylenically unsaturated hydrocarbons (polyethylene, polypropylene and polystyrene) have never seriously encroached on the market for packaging films such as regenerated cellulose film. In thicknesses necessary for packaging films, these polyhydrocarbon films are limp and tend to exhibit haziness where transparency, clarity and high gloss are desired. Their limpness and thermoplasticity make the films difficult to handle in standard packaging machinery. The surfaces of such films do not retain printed information satisfactorily.

These polymeric films do exhibit outstanding flexibility, tear strength, resistance to deterioration by greases and oils, abrasion resistance and low moisture permeability. These properties have made the polyhydrocarbons, particularly polyethylene, useful in some packaging operations and potentially useful as a coating for other non-fibrous films such as regenerated cellulose film. But as a coating, the polyhydrocarbons have never realized their full potentiality. The reason—the adhesion between the polyhydrocarbons and films such as regenerated cellulose film is so poor as to render the combination practically useless. Various adhesion promoters have been suggested. When high relative humidity conditions are encountered, most of them fail. Other adhesion promoters, although improving adhesion, tend to add a blush or haze problem to the manufacturer's problems.

It is an object of the present invention to provide a polyhydrocarbon composition which, when applied as a coating, will adhere tenaciously to a variety of non-fibrous, flexible base sheets even under high relative humidity conditions. Another object is to provide a final film in which the desirable properties of the base sheet and the desirable properties of the polyhydrocarbons are retained. Other objects will appear hereinafter.

The objects are accomplished by providing a non-fibrous, flexible base sheet such as regenerated cellulose film coated with a composition comprising essentially 90–99% of a polyhydrocarbon, preferably a polymer of an ethylenically unsaturated hydrocarbon such as polyethylene, 1–10% of a compound having a plurality of —N=C=X groups characterized by intermediate

linkages and a molecular weight of 200 to 10,000, wherein X is a chalcogen (Journal American Chemical Society, 63, p. 892 (1941)) of atomic weight less than 35.

The term "polyhydrocarbon," unless otherwise modified, as used throughout the specification, is intended to be used in its usual and accepted generic sense. The preferred hydrocarbon polymers for use in this invention are the polymers of ethylenically unsaturated alpha olefins not limited to mono-olefins but include dienes, trienes, etc., and/or copolymers thereof. Some of the most useful polymers include polyethylene, polypropylene, polyisobutylene, polymethylene, polybutadiene, polynorbornylene, polystyrene and polymethylstyrene.

The preferred coating composition comprises 90–99% of polyethylene and 1–10% of "Mondur" C, a polyurethane with isocyanate end groups formed by the reaction of 1 mole of trimethylolpropane with 3 moles of 2,4-toluene diisocyanate.

The polyethylene used for the purpose of this invention is the normally solid, crystalline polymer of the formula: $(CH_2)_x$. It is formed by the polymerization of ethylene in any known manner, c.f., U.S. Patent 2,153,553.

The poly-N=C=X compounds are the reaction products of diisocyanates or diisothiocyanates or both with polyhydroxy alcohols, polyesters, polyamides and polyamines at a molar ratio of at least 2 moles of diisocyanate or diisothiocyanate to 1 mole of the latter compounds. The requirement is for an excess of —N=C=X groups over the —OH or —NH groups, so that at least two of the original —N=C=X groups will remain as such in the condensation product. A preferred composition might be two equivalents of a polyisocyanate to one equivalent of polyol. The preferred reaction products are the polyisocyanates with intermediate urethane

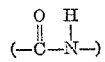

linkages further characterized by a molecular weight of 200 to 10,000.

The composition, in condition suitable for coating, is most easily prepared by dissolving the solids, i.e., the polyhydrocarbon and the poly-N=C=X compound in a common volatile organic solvent, e.g., toluene, or in a mixture of solvents. The polyhydrocarbon should comprise from 90% to 99% by weight of the solids content of the coating composition and the poly-N=C=X compound should comprise from 1% to 10% of the solids content of the composition. Concentrations of the poly-N=C=X compound in excess of 10% give cloudy coatings which indicate incompatability between the polymers above this level. Such compositions also tend to remain tacky and are difficult to dry. If less than 1% of the poly-N=C=X compound is used, the adhesion is poor and the advantageous results of this invention are not realized. It is to be understood, of course, that any other suitable method for combining the essential ingredients of the composition may be employed, such as melt mixing, milling, dispersing in aqueous medium (water), etc. The composition, however prepared, may be coated on one or both sides of the non-fibrous base sheet by dip, spray, melt extrusion, or any other convenient coating expedient.

Because of the wide use and commercial importance of regenerated cellulose film as a wrapping material, the description of the invention will mostly concern coating regenerated cellulose film. The composition of this invention, however, may be applied with advantage to any non-fibrous, flexible, transparent sheet material. Such materials include the cellulosic materials such as regenerated cellulose, hydroxyethyl cellulose, carboxymethyl cellulose, amylose, cellulose acetate, ethyl celluose, cellulose nitrate and others such as vinylidene chloride polymers, nylon, polyethylene terephthalate, polyvinyl alcohol, polyvinyl butyral, hydrolyzed vinyl acetate interpolymer, caseine, gelatin or films formed from mixtures of these or regenerated cellulose film coated with any of these materials. The regenerated cellulose film used in the invention may have been prepared by the viscose process, the cuprammonium process or other processes.

Although the polyhydrocarbon coating compositions of this invention adhere strongly to the non-fibrous base sheets without the necessity of an intermediate anchor coating, or the incorporation in the base sheet of an agent which functions to bond the protective coating to the base sheet, the application of the coating compositions described herein to base films modified by the addition of an intermediate anchor coat or agent, is not to be regarded as outside the scope of this invention. In the case of regenerated cellulose base sheets, in particular, it is of advantage, especially when the coated sheet is to be subjected to conditions of high moisture, to employ any of the known means for improving coating adhesion, e.g., the application of an anchor sub-coat as disclosed in Jebens U.S.P. 2,280,829, or by impregnating the base sheet prior to coating with an anchoring agent of thermosetting resin such as a urea-aldehyde resin, phenol-formaldehyde resin, ketone-aldehyde resin, amine modified urea-aldehyde resin, alcohol modified urea-aldehyde resin, etc., disclosed, for example, in Charch and Bateman, U.S. Patent 2,159,007; Ellis, U.S. Patent 2,523,868; and Chapman, U.S. Patent 2,533,557.

The invention will be more clearly understood by referring to the descriptive material and the examples which follow. Unless otherwise stated, all parts and percentages given in the examples are by weight. It should be understood that the examples, although illustrating specific embodiments of the present invention, should not be considered limitative.

For convenience, abbreviations and commercial names have been used in the tables accompanying the examples. PE represents polyethylene; PS, polystyrene; PP, polypropylene; S/IB, a copolymer from 50% styrene and 50% isobutylene; RCD 2027, a polyurethane with isocyanate end groups; DV–4678, a polyurethane with isocyanate end groups formed from the reaction of 1 mole of trimethylolethane with 3 moles of 2,4-toluene diisocyanate; DV–4680, a polyurethane with isocyanate end groups formed from the reaction of 1 mole of trimethylolpropane with 3 moles of 2,4-toluene diisocyanate; and MC, "Mondur" C, a polyurethane with isocyanate end groups formed from the reaction of 1 mole of trimethylolpropane with 3 moles of 2,4-toluene diisocyanate.

EXAMPLE I

A solution was prepared by dissolving 98 parts of polyethylene and 2 parts of "Mondur" C in 400 parts of toluene at 100°–105° C. A base film of regenerated cellulose approximately 1 mil thick was unwound from a roll, passed over a tension roll, then over a guide roll into a tank containing the coating solution. The coated film was then passed between two "doctor" rolls which served to smooth the coating and to regulate its thickness. The coated film was dried in a tower maintained at a temperature between 145° C. and 185° C. The coating weight was approximately 4 grams/square meter.

As a control, 100 parts of polyethylene in 400 parts of toluene was used. The coating procedure was identical to that described above.

In Table 1 the peel heat-seal strength and the adhesion in direct contact with water (anchorage) are compared for the 2 coated films. The details for measuring these properties are as follows:

Peel heat-seal strength is a measure of the strength of the bond between two films when they are sealed together by heat and pressure. A piece of the coated film 4"x10" with the grain running in the long direction is cut into two pieces 4"x5". The two pieces are superimposed so that opposite surfaces are in contact. The two pieces of superimposed film are then sealed together at each end at right angles to the grain. A ¾" wide sealing bar heated to a temperature of 130° C. contains the ends for 2 seconds at a pressure of 20 p.s.i. The sealed sheets are then cut in half at right angles to the grain. From the center of the four resulting pieces 1½" wide strips parallel to the grain are cut. The four sets of strips are then conditioned for 48 hours at 34° C. and 81% relative humidity. They are tested by opening each set of strips at the free ends, placing them in a Suter testing machine and pulling them apart. The force in grams required to separate the seal after it has been ruptured is the peel heat-seal strength.

Anchorage refers to the adhesion of the coating to the base film when in direct contact with water. Samples of the coated film are suspended in water at 25° C. for 60 hours and then graded approximately as follows:

Grade 1 --- No blisters.
Grade 2 --- Few blisters.
Grade 3 --- Decided blistering.
Grade 4 --- Coating sloughs off at blistered or unblistered portions.

*Table 1*

PROPERTIES OF COATED REGENERATED CELLULOSE FILM OF EXAMPLE I COMPARED TO A CONTROL

| Example | Composition (Percent by wt.) | Peel Heat-Seal Strength | Anchorage |
| --- | --- | --- | --- |
| I | 98PE–2MC | 100 | 3 |
| Control | 100PE | 20 | 4 |

EXAMPLES II–VI

Example I was repeated except that the gel regenerated cellulose film was first impregnated (in the softener bath) with an anchoring agent, a guanidine-ureaformaldehyde resin. The resin had been obtained by reacting together about 0.04 mole of guanidine nitrate, about 2.3 moles of formaldehyde and about 1 mole of urea. The preparation of the resin and the manner of impregnating the regenerated cellulose film are substantially as described in Example I of U.S. Patent No. 2,533,557.

The resulting film, containing 0.3% by weight of resin based on the weight of the cellulose, was coated with solutions in 400 parts of toluene of the following ingredients: For Example II, 98PE and 2 MC; Example III, 96PE and 4 MC; Example IV, 96PE and 6 MC; Example V, 93PE and 7 MC; Example VI, 90PE and 10MC; Control, 100PE. The physical properties are compared in Table 2.

*Table 2*

PROPERTIES OF COATED, RESIN-IMPREGNATED REGENERATED CELLULOSE FILMS OF EXAMPLES II–VI COMPARED TO A CONTROL

| Example | Composition (Percent by wt.) | Peel Heat-Seal Strength | Anchorage |
| --- | --- | --- | --- |
| II | 98PE–2MC | 125 | 2 |
| III | 96PE–4MC | 160 | 2 |
| IV | 94.1PE–5.9MC | 175 | 1 |
| V | 93PE–7MC | 185 | 1 |
| VI | 90PE–10MC | 175 | 1 |
| Control | 100PE | 35 | 4 |

EXAMPLE VII

A resin-impregnated film (0.3% guanidine-urea-formaldehyde resin) similar to that used in Examples II–VI was coated in the manner previously described with solutions of polystyrene in 400 parts of toluene. In Example VII, 95 parts PS and 5 parts DV–4678 were used and in the control, the DV–4678 was omitted. The properties are compared in Table 3.

*Table 3*

PROPERTIES OF COATED, RESIN-IMPREGNATED REGENERATED CELLULOSE FILM OF EXAMPLE VII COMPARED TO A CONTROL

| Example | Composition (Percent by wt.) | Peel Heat-Seal Strength | Anchorage |
| --- | --- | --- | --- |
| VII | 95PS–5DV–4678 | 225 | 1 |
| Control | 100PS | 25 | 4 |

EXAMPLE VIII

A resin-impregnated film (0.3% guanidine-urea-formaldehyde resin) similar to that used in Examples II–VI was coated in the manner previously described with solutions of a polymer prepared using 50% styrene and 50% isobutylene in 900 parts of toluene. In Example VIII, 92 parts S/IB and 8 parts DV-4680 were used and in the control, the DV-4680 was omitted. The properties are compared in Table 4.

Table 4
PROPERTIES OF COATED, RESIN-IMPREGNATED REGENERATED CELLULOSE FILM OF EXAMPLE VIII COMPARED TO A CONTROL

| Example | Composition (Percent by wt.) | Peel Heat-Seal Strength | Anchorage |
| --- | --- | --- | --- |
| VIII | 92S/IB–8DV–4680 | 200 | 2 |
| Control | 100S/IB | 30 | 4 |

EXAMPLE IX

A regenerated cellulose film similar to that used in Example I (not resin-impregnated) was coated in the manner previously described with solutions of polypropylene in 400 parts of toluene. In Example IX, 90 parts PP and 10 parts RCD–2027 were used and in the control, the RCD–2027 was omitted. The properties are compared in Table 5.

Table 5
PROPERTIES OF COATED REGENERATED CELLULOSE FILM OF EXAMPLE IX COMPARED TO A CONTROL

| Example | Composition (Percent by wt.) | Peel Heat-Seal Strength | Anchorage |
| --- | --- | --- | --- |
| IX | 90PP–10RCD–2027 | 150 | 3 |
| Control | 100PP | 20 | 4 |

EXAMPLE X

The coating procedure previously described was repeated using a polyethylene terephthalate film .001 inch thick and a coating solution of 98 parts PE and 2 parts DV–4678 in 400 parts toluene. The coating weight was, as in previous examples, about 4 grams/square meter. As a control, a solution omitting the DV–4678 was used but the coating weight was kept at about the same weight. Properties are compared in Table 6.

Table 6
PROPERTIES OF COATED POLYETHYLENE TEREPHTHALATE FILM OF EXAMPLE X COMPARED TO A CONTROL

| Example | Composition (Percent by wt.) | Peel Heat-Seal Strength | Anchorage |
| --- | --- | --- | --- |
| X | 98PE–2DV–4678 | 275 | 1 |
| Control | 100PE | 175 | 3 |

EXAMPLE XI

The procedure of Example X was repeated using cellulose acetate film .001 inch thick as the base sheet and a coating solution of 96 parts polypropylene and 4 parts DV–4680 in 600 parts toluene. The results compared to a control are presented in Table 7.

Table 7
PROPERTIES OF COATED CELLULOSE ACETATE FILM OF EXAMPLE XI COMPARED TO A CONTROL

| Example | Composition (Percent by wt.) | Peel Heat-Seal Strength | Anchorage |
| --- | --- | --- | --- |
| XI | 96PP–4DV–4680 | 250 | 2 |
| Control | 100PP | 125 | 4 |

The importance of the poly-N=C=X (X being a chalcogen of atomic weight less than 35) compounds in the polyhydrocarbon coating composition is illustrated in the foregoing examples. Adhesion, particularly under conditions of high humidity, may be improved almost ten-fold over cases where the poly-N=C=X compound is omitted.

The useful poly-N=C=X compounds may be depicted by the general formula: X=C=N—Y—N=C=X, where Y represents organic radicals containing a plurality of

linkages and X is a chalcogen of atomic weight less than 35. Thus, Y may contain a plurality of divalent polyurethane linkages or divalent polythiourethane linkages or at least one of each, Y having a total molecular weight of 80–9,900. These compounds include the reaction product of 3 moles of 2,4-toluene diisocyanate with 1 mole of trimethylolethane; reaction product of 3 moles of 2,4-toluene diisocyanate with 1 mole of trimethylolpropane; reaction product of polyethylene glycol with a slight excess of 2,4-toluene diisocyanate; reaction product of polypentamethylene adipate with a slight excess of 2,4-toluene diisocyanate; reaction product of propylene oxide/ethylene oxide copolyether glycols with 2,4-toluene diisocyanate; reaction product of trimethylolpropane, and polytetramethylene glycol with 2,4-toluene diisocyanate; polyureas derived from the reaction of amine-terminated polyamides plus 2,4-toluene diisocyanate and polyurea derived from the reaction of water with a slight excess of 2,4-toluene diisocyanate; the corresponding reaction products using 2,4-toluene diisothiocyanate instead of the diisocyanate and the reaction product of trimethylolpropane with an excess of both 2,4-toluene diisocyanate and 2,4-toluene diisothiocyanate.

While the invention contemplates the use of the polyhydrocarbon and the poly-N=C=X compound as the essential constituents of the coatings, other ingredients may be added. The addition of pigments, dyes, delusterants, fillers, binders, plasticizers, etc., is therefore understood to be within the purview of this invention.

The compositions of the invention are preferably applied from a solution in an inert solvent. The solvent is preferably anhydrous, although this is not absolutely necessary. Hydrocarbons such as benzene, toluene, xylene or petroleum fractions are preferred solvents. Halogenated hydrocarbons, ethers, and tertiary amines may also be used.

Various procedures may be used to coat the non-fibrous, flexible base sheet. The sheet may be dipped into the coating solution or the solution may be sprayed, brushed, etc., on one or both sides of the sheet. The coated sheet is then permitted to dry by a step in which the solvent in the coating solution is driven off, usually in the case of most solvents by exposure to elevated temperatures.

It is believed that the improvement in adhesion is obtained by a complex reaction and the degree of improvement depends upon the reactivity of the polymers. The improvement is probably due to chemical and physical bonding. To what extent the improvement is due to chemical bonding and to what extent it is due to physical forces is not known.

The presence of water in the polyhydrocarbon seems to have little or no effect in the invention. Polyhydrocarbons which have been dried prior to incorporation in the coating composition are, surprisingly, no more effective in improving adhesion at high humidities than the polyhydrocarbons which have not been dried.

The coated regenerated cellulose films, polyethylene terephthalate films, cellulose acetate films, etc., prepared in accordance with the present invention are useful in the packaging of foods, cigarettes, hardware, etc., in the preparation of adhesive and sound tapes, etc. In short, the coated films are useful wherever the base films or the base films coated with polyhydrocarbon coatings have been used heretofore.

As many widely different embodiments may be made without departing from the spirit and scope of this invention, it is understood that the invention is not limited except as defined in the appended claims.

What is claimed is:

1. A non-fibrous, flexible base sheet having at least one surface coated with a composition comprising essentially 90–99% of a polymer of an ethylenically unsaturated hydrocarbon selected from the group consisting of polyethylene, polypropylene, polystyrene and a copolymer obtained from 50% styrene and 50% isobutylene and 1–10% of a compound having a plurality of —N=C=X groups characterized by a plurality of intermediate

linkages and a molecular weight of 200 to 10,000, wherein X is a chalcogen of atomic weight less than 35.

2. A regenerated cellulose film having at least one surface coated with a composition comprising essentially 90–99% of a polymer of an ethylenically unsaturated hydrocarbon selected from the group consisting of polyethylene, polypropylene, polystyrene and a copolymer obtained from 50% styrene and 50% isobutylene and 1–10% of a compound having a plurality of —N=C=X groups characterized by a plurality of intermediate

linkages and a molecular weight of 200 to 10,000, wherein X is a chalcogen of atomic weight less than 35.

3. A polyethylene terephthalate film having at least one surface coated with a composition comprising essentially 90–99% of a polymer of an ethylenically unsaturated hydrocarbon selected from the group consisting of polyethylene, polypropylene, polystyrene and a copolymer obtained from 50% styrene and 50% isobutylene and 1–10% of a compound having a plurality of —N=C=X groups characterized by a plurality of intermediate

linkages and a molecular weight of 200 to 10,000, wherein X is a chalcogen of atomic weight less than 35.

4. A cellulose acetate film having at least one surface coated with a composition comprising essentially 90–99% of a polymer of an ethylenically unsaturated hydrocarbon selected from the group consisting of polyethylene, polypropylene, polystyrene and a copolymer obtained from 50% styrene and 50% isobutylene and 1–10% of a compound having a plurality of —N=C=X groups characterized by a plurality of intermediate

linkages and a molecular weight of 200 to 10,000, wherein X is a chalcogen of atomic weight less than 35.

5. A regenerated cellulose film impregnated with a thermo-set resin having at least one surface coated with a composition comprising essentially 90–99% of a polymer of an ethylenically unsaturated hydrocarbon selected from the group consisting of polyethylene, polypropylene, polystyrene and a copolymer obtained from 50% styrene and 50% isobutylene and 1–10% of a compound having a plurality of —N=C=X groups characterized by a plurality of intermediate

linkages and a molecular weight of 200 to 10,000, wherein X is a chalcogen of atomic weight less than 35.

6. A regenerated cellulose film as in claim 5 wherein the thermo-set resin is a guanidine-urea-formaldehyde resin.

7. A regenerated cellulose film having at least one surface coated with a composition comprising essentially 90–99% of polyethylene and 1–10% of a polyurethane with isocyanate end groups having a molecular weight of 200–10,000.

8. A regenerated cellulose film impregnated with a thermo-set resin having at least one surface coated with 90–99% of polyethyleyne and 1–10% of a polyurethane with isocyanate end groups having a molecular weight of 200–10,000.

9. A coating composition comprising essentially 90–99% of a polymer of an ethylenically unsaturated hydrocarbon selected from the group consisting of polyethylene, polypropylene, polystyrene and a copolymer obtained from 50% styrene and 50% isobutylene and 1–10% of a compound having a plurality of —N=C=X groups characterized by a plurality of intermediate

linkages and a molecular weight of 200 to 10,000, wherein X is a chalcogen of atomic weight less than 35.

10. A coating composition as in claim 9 wherein said polymer of an ethylenically unsaturated hydrocarbon is polyethylene.

11. A coating composition as in claim 9 wherein said polymer of an ethylenically unsaturated hydrocarbon is polypropylene.

12. A coating composition as in claim 9 wherein said polymer of an ethylenically unsaturated hydrocarbon is polystyrene.

13. A coating composition as in claim 9 wherein said polymer of an ethylenically unsaturated hydrocarbon is a copolymer obtained from 50% styrene and 50% isobutylene.

14. A coating composition as in claim 9 wherein the poly-N=C=X compound is a polyurethane with isocyanate end groups having a molecular weight of 200 to 10,000.

15. A coating composition as in claim 9 wherein the poly-N=C=X compound is the reaction product of 1 mole of trimethylolpropane with 3 moles of 2,4-toluene diisocyanate.

16. A coating composition as in claim 9 wherein the poly-N=C=X compound is the reaction product of 1 mole of trimethylolethane with 3 moles of 2,4-toluene diisocyanate.

17. A coating composition comprising essentially 90–99% of a polymer of an ethylenically unsaturated hydrocarbon selected from the group consisting of polyethylene, polypropylene, polystyrene and a copolymer obtained from 50% styrene and 50% isobutylene and 1–10% of a compound having a plurality of —N=C=X groups characterized by a plurality of intermediate

linkages and a molecular weight of 200 to 10,000, wherein X is a chalcogen of atomic weight less than 35 dissolved in a volatile organic solvent.

18. A coating composition as in claim 17 wherein the volatile organic solvent is toluene.

19. A process for coating a non-fibrous flexible base sheet which comprises dissolving 90–99% of a polymer of an ethylenically unsaturated hydrocarbon selected from the group consisting of polyethylene, polypropylene, polystyrene and a copolymer obtained from 50% styrene and 50% isobutylene and 1-10% of a compound having a plurality of —N=C=X groups characterized by intermediate

linkages and a molecular weight of 200 to 10,000 wherein X is a chalcogen of atomic weight less than 35 in a volatile organic solvent to form a solution; coating at least one surface of said non-fibrous flexible base sheet with said solution and removing the solvent from the coating to provide a coating having substantially the properties of the polymer of the ethylenically unsaturated hydrocarbon.

20. A process as in claim 19 wherein the base sheet is regenerated cellulose film.

21. A process as in claim 19 wherein said polymer of an ethylenically unsaturated hydrocarbon is polyethylene.

22. A process as in claim 19 wherein said polymer of an ethylenically unsaturated hydrocarbon is polypropylene.

23. A process as in claim 19 wherein said polymer of an ethylenically unsaturated hydrocarbon is polystyrene.

24. A process as in claim 19 wherein said polymer of an ethylenically unsaturated hydrocarbon is a copolymer obtained from 50% styrene and 50% isobutylene.

25. A process as in claim 19 wherein the poly-N=C=X compound is a polyurethane with isocyanate end groups having a molecular weight of 200 to 10,000.

26. A process as in claim 19 wherein the poly-N=C=X compound is the reaction product of 1 mole of trimethylolpropane with 3 moles of 2,4-toluene diisocyanate.

27. A process as in claim 19 wherein the poly-N=C=X compound is the reaction product of 1 mole of trimethylolethane with 3 moles of 2,4-toluene diisocyanate.

28. A process for coating regenerated cellulose film which comprises dissolving 90-99% of polyethylene and 1-10% of a polyurethane with isocyanate end groups formed from the reaction of 1 mole of trimethylolpropane with 3 moles of 2,4-toluene diisocyanate in a volatile organic solvent to form a solution; coating at least one surface of said regenerated cellulose film with the solution; driving off said solvent at an elevated temperature to provide a coating having substantially the properties of polyethylene.

29. A coated regenerated cellulose film as in claim 7 wherein said polyurethane with isocyanate end groups having a molecular weight of 200 to 10,000 is the reaction product of 1 mole of trimethylolpropane with 3 moles of 2,4-toluene diisocyanate.

30. A coating composition as in claim 10 wherein the poly-N=C=X compound is the reaction product of 1 mole of trimethylolpropane with 3 moles of 2,4-toluene diisocyanate.

References Cited in the file of this patent

UNITED STATES PATENTS

| | | |
|---|---|---|
| 2,342,209 | Mitchell | Feb. 22, 1944 |
| 2,430,479 | Pratt et al. | Nov. 11, 1947 |
| 2,439,369 | Nicol | Apr. 6, 1948 |
| 2,555,745 | Hopkins et al. | June 5, 1951 |
| 2,676,164 | Charlton et al. | Apr. 20, 1954 |
| 2,806,835 | Nischk et al. | Sept. 17, 1957 |
| 2,851,436 | Forsythe | Sept. 9, 1958 |

FOREIGN PATENTS

| | | |
|---|---|---|
| 721,673 | Great Britain | Jan. 12, 1955 |
| 863,407 | Germany | Jan. 19, 1953 |